(12) United States Patent
Araki (10) Patent No.: US 9,218,436 B2
(45) Date of Patent: Dec. 22, 2015

(54) DATA SYNCHRONIZATION SYSTEM (75) Inventor: Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 459 days.

(21) Appl. No.: 13/254,317

(22) PCT Filed: Jan. 25, 2010

(86) PCT No.: PCT/JP2010/050893
§ 371 (c)(1),
(2), (4) Date: Sep. 1, 2011

(87) PCT Pub. No.: WO2010/106832
PCT Pub. Date: Sep. 23, 2010

(65) Prior Publication Data
US 2011/0320635 A1 Dec. 29, 2011

(30) Foreign Application Priority Data
Mar. 18, 2009 (JP) ................. 2009-066297

(51) Int. Cl.
*G06F 15/173* (2006.01)
*G06F 17/30* (2006.01)
*G05B 15/02* (2006.01)
*H04L 29/08* (2006.01)

(52) U.S. Cl.
CPC .......... *G06F 17/30902* (2013.01); *G05B 15/02* (2013.01); *H04L 29/08072* (2013.01)

(58) Field of Classification Search
CPC ............ H04L 29/08072; G05B 15/02
USPC ............ 709/220, 228, 232, 224; 700/83
See application file for complete search history.

(56) References Cited

U.S. PATENT DOCUMENTS

| | | | | |
|---|---|---|---|---|
| 6,640,145 | B2 * | 10/2003 | Hoffberg et al. | 700/83 |
| 8,112,504 | B2 * | 2/2012 | Logan et al. | 709/219 |
| 2002/0065912 | A1 * | 5/2002 | Catchpole et al. | 709/224 |
| 2002/0151992 | A1 * | 10/2002 | Hoffberg | G05B 19/0426 700/83 |
| 2008/0155616 | A1 * | 6/2008 | Logan et al. | 725/93 |
| 2009/0177303 | A1 * | 7/2009 | Logan et al. | 700/94 |

FOREIGN PATENT DOCUMENTS

| | | |
|---|---|---|
| JP | 2002183085 A | 6/2002 |
| JP | 2003203033 | 7/2003 |
| JP | 2004-13479 A | 1/2004 |
| JP | 2004094682 A | 3/2004 |

(Continued)

OTHER PUBLICATIONS

Japanese Office Action for JP2011-504769 mailed on Jun. 11, 2013 with Partial English Translation.

(Continued)

Primary Examiner — Khanh Dinh (57) ABSTRACT

While a server (110) that executes a first web application program that accomplishes a web application that provides a service over the Internet so as to provide the service is not connected to a client (100) that receives the service, the client (100) executes a second web application program that accomplishes a web application, records a procedure in which the client (100) has executed the second application program, and transmits the recorded procedure to the server (110) just after the client (100) and the server (110) are connected and then the server (110) executes the first web application based on the procedure transmitted from the client (100).

12 Claims, 6 Drawing Sheets (56) References Cited

FOREIGN PATENT DOCUMENTS

| JP | 2008269277 A | 11/2008 |
|----|--------------|---------|
| JP | 2009500749   | 1/2009  |

OTHER PUBLICATIONS

International Search Report for PCT/JP2010/050893 mailed Feb. 16, 2010.

* cited by examiner

DATA SYNCHRONIZATION SYSTEM

TECHNICAL FIELD

The present invention relates to a data synchronization system, a server, a communication device, a data synchronization method, and a program that synchronize data.

BACKGROUND ART

In recent years, web applications using web browsers have become common. Web applications include various types such as shopping sites, blogs, and bulletin boards.

Ordinarily, a program of a web application using a web browser operates on a server and the web browser only displays data and information that the program generates. As a result, if a communication device on which the web browser operates is not connected to the server, a problem occurs in which the web application cannot be used on the communication device.

To solve this problem, a system in which a web application provided by the server is executed off line has been contemplated (for example, refer to Patent Literature 1).

A transaction system using a web browser presented in Patent Literature 1 provides a client side that is a communication device with transaction software (a web server, a transaction processing section, and a database) that is used when the client is not connected to the network (in the off line state) such that the client can use the transaction system in the off line state. Thus, even if the client is off line, the client can use the transaction system.

The data base that the client of the transaction system uses while the transaction system is off line has a data update flag that denotes whether an update has been made. If data have been updated while the transaction system was off line, this data update flag denotes that data have been updated. Data having the data update flag that denotes that an update has been made are uploaded to the server such that data stored in the server and data stored in the client are synchronized.

RELATED ART LITERATURE

Patent Literature

Patent Literature 1: JP2004-094682A, Publication (Paragraph 0005, Paragraph 0008, FIG. 1)

SUMMARY OF THE INVENTION

Problem to be Solved by the Invention

However, in the system presented in Patent Literature 1, if a data synchronization technique that is used in ordinary systems is applied, it is unlikely that data will be correctly synchronized between the client side and the server side.

In the following, a reason will be described that exemplifies the case of a web application for a blog.

When an article is submitted to the blog, an article ID (Identification) that is identification information that represents the article is newly generated and the contents of the article are recorded in the database. At this point, it the client is off line, if an article is submitted to a web server provided in the client, a new article ID is generated in the database provided in the client.

At the same time, if an article is submitted on the server side, a new article ID is likewise generated on the server side.

At this point, the article submitted on the server side is one submitted on another client that is on line and connected to the server.

A blog program may generate article IDs in succession. As described above, when an article ID is generated on the client side that is off line, if an article ID is generated on the server side, it is likely that their article IDs may overlap with each other.

If article IDs overlap with each other, when data are synchronized according to an ordinary technique, the article submitted on the server side may be overwritten with the article that was newly submitted when the client was off line. In other words, although a new article was submitted while the client side was off line, the article has not been submitted to the server side.

Besides the above-described problem about overlapping of article IDs, it is likely that problems about the numbers of views and submissions of articles arise.

For example, if an article was browsed or submitted on the web server provided in the client, the number of views or submissions would have been updated in the database provided in the client. At the same time, if the article was browsed or submitted simultaneously on the server side, the number of views or submissions would have been also updated in the database on the server side.

Thus, if an attempt is made to synchronize the number of updates on the client side with that on the server side according to an ordinary technique, data on the server side are overwritten with the number of views and the number of submissions on the server side and thereby information about the number of views and the number of submissions on the server side is lost.

Programs need to be carefully coded such that the foregoing problems do not occur. However, in the case of complicated programs, it is difficult to ensure that such problems do not occur. In addition, if an attempt is made to use an existing application off line, it is very difficult to modify the program such that the above-described problems do not occur.

An object of the present invention is to provide a data synchronization system, a server, a communication device, a data synchronization method, and a program that can solve the above-described problems.

Means that Solve the Problems

A data synchronization system according to the present invention is a data synchronization system comprising: a server that executes a first web application program that accomplishes a web application that provides a service over the Internet so as to provide said service; and a communication device that receives the service that the server provides, wherein said communication device has a second web application program that accomplishes said web application, executes said second web application program while said communication device is not connected to said server, records a procedure in which said communication device has executed said second web application program, and transmits said recorded procedure to said server just after said communication device is connected to said server, and wherein said server executes said first web application program based on the procedure transmitted from said communication device.

In addition, a server according to the present invention is a server that executes a web application program that accomplishes a web application that provides a service over the Internet, comprising:

a reproduction executing section that executes said web application program based on a procedure transmitted from a communication device that receives the service that the server provides.

A communication device according to the present invention is a communication device that receives a service from a server that accomplishes a web application that provides the service over the Internet, comprising:

a web application program that accomplishes said web application;

an input recording section that records a procedure of said web application program executed while said communication device is not connected to said server; and a communication section that transmits the procedure recorded in said input recording section to said server just after said communication device is connected to said server.

A data synchronization method according to the present invention is a data synchronization method that synchronizes data between a server that executes a first web application program that accomplishes a web application that provides a service over the Internet so as to provide said service and a communication device that receives the service that the server provides, comprising:

a process that causes said communication device to execute a second web application program that accomplishes said web application while said communication device is not connected to said server;

a process that causes said communication device to record a procedure in which said communication device has executed said second web application program while said communication device is not connected to said server;

a process that causes said communication device to transmit said recorded procedure to said server just after said communication device is connected to said server; and a process that causes said server to execute said first web application program based on the procedure transmitted from said communication device.

A program according to the present invention is a program that causes a server that provides a service over the Internet to accomplish functions, comprising:

a function that provides a service to a communication device based on a procedure transmitted from the communication device that receives said service that the server provides.

A program according to the present invention is a program that causes a communication device that receives a service from a server that accomplishes a web application that provides said service over the Internet to accomplish functions, comprising:

a function that executes a web application program that accomplishes said web application;

a function that records a procedure of said web application program executed while said communication device is not connected to said server; and a function that transmits said recorded procedure to said server just after said communication device is connected to said server.

Effect of the Invention

As described above, according to the present invention, while a server that executes a first web application program that accomplishes a web application that provides a service over the Internet so as to provide the service is not connected to a communication device that receives the service, the communication device executes a second web application program that accomplishes a web application, records a procedure in which the communication device has executed the second application program, and transmits the recorded procedure to the server just after the communication device and the server are connected and then the server executes the first web application based on the procedure transmitted from the communication device, thereby data can be easily and correctly synchronized between the client and the server.

BEST MODES THAT CARRY OUT THE INVENTION

In the following, with reference to drawings, embodiments of the present invention will be described.

Figure 1:
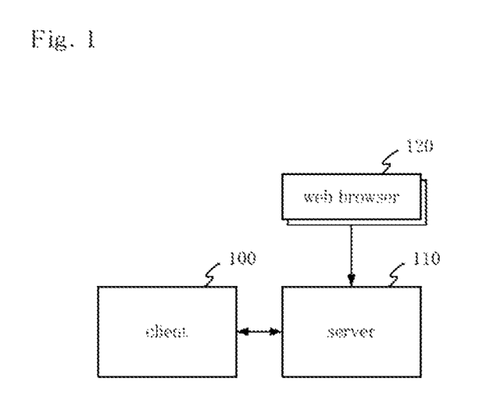
FIG. 1 is a schematic diagram showing a data synchronization system according to an embodiment of the present invention.

FIG. 1 is a schematic diagram showing a data synchronization system according to an embodiment of the present invention.

The data synchronization system according to this embodiment is composed of client 100, server 110, and web browser 120 as shown in FIG. 1.

Server 110 executes a predetermined program so as to provide a service over the Internet. For example, server 110 provides a web application.

Client 100 is a communication device (computer) that receives the service that server 110 provides.

Web browser 120 accesses server 110 so as to request server 110 to provide the service to client 100.

In the structure shown in FIG. 1, although client 100 and server 110 are directly connected, they may be connected through a network such as the Internet.

Figure 2:
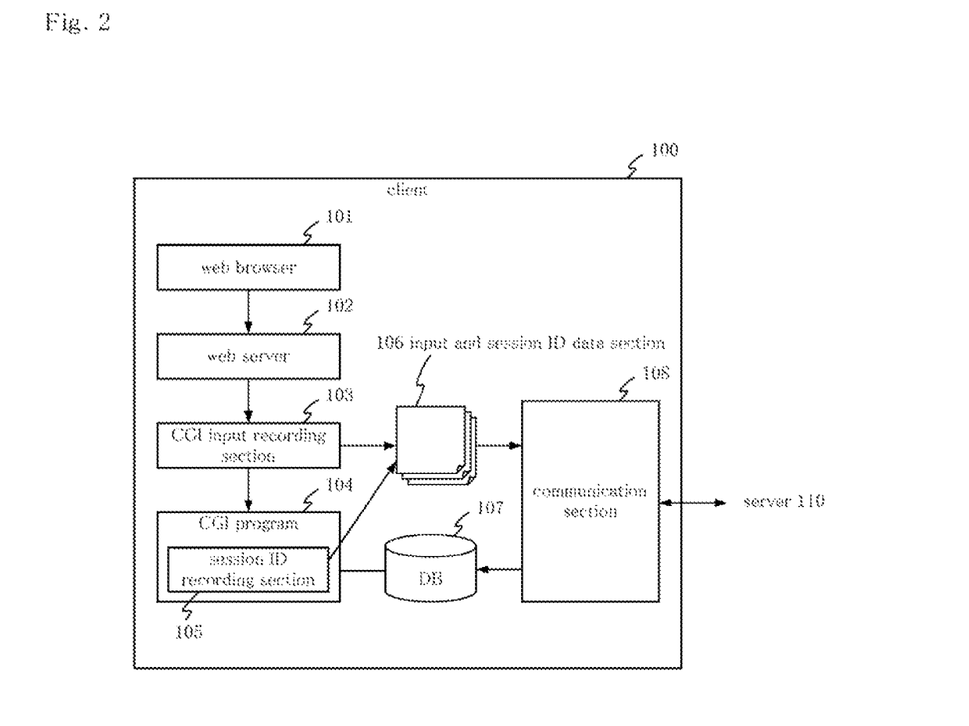
FIG. 2 is a schematic diagram showing an exemplary internal structure of a client shown in FIG. 1.

FIG. 2 is a schematic diagram showing an exemplary internal structure of client 100 shown in FIG. 1.

Client 100 shown in FIG. 1 is provided with web browser 101, web server 102, CGI input recording section 103, CGI program 104, input and session ID data section 106, DB 107, and communication section 108 as shown in FIG. 2. Note that FIG. 2 shows only structural elements relating to the present invention of those of client 100 shown in FIG. 1.

Web browser 101 is ordinary software used for the web application. The web application is accomplished in such a manner that web server 102 invokes (executes) CGI program 104 through a CGI (Common Gateway Interface).

Web server 102 is software that is provided with an information transmission function over the Internet. In addition, web server 102 executes CGI program 104 when web browser 101 requests web server 102 to do so while client 100 and server 110 are not connected.

CGI input recording section 103 is an input recording section that records an input with which web server 102 invokes CGI program 104. In addition, CGI input recording section 103 stores recorded inputs in input and session ID data section 106 in the forward chronological order (oldest first) of recorded inputs and invokes CGI program 104. When inputs are stored in forward chronological order, they may be stored such that they have a chronological order. Inputs from web server 102 are supplied as standard inputs and arguments of CGI program 104 and environmental variables upon startup of the program.

CGI program 104 is a second web application program that web server 102 executes as web browser 101 requests it to do so. Here, CGI program 104 will be described exemplifying the case in which an interface that executes the web application program is a CGI. Besides a' CGI, this interface may be an interface that can store input data necessary to re-execute the web application program. In addition, CGI program 104 is executed based on an input supplied from web server 102 and data stored in DB 107 and then an output as the result is returned to web browser 101.

In addition, CGI program 104 is provided with session ID recording section 105.

If CGI program 104 manages sessions (session management), session ID recording section 105 records session IDs (Identifications) that the web application uses.

Here, the session management will be described.

Ordinarily, accesses to the web server are independently treated. However, there is a situation in which individual accesses need to be treated as a series of accesses. For example, on a shopping site, there may be a case in which a product is stored in the shopping cart and then the product is purchased. When the product is purchased, the web application needs to know the contents of the shopping cart. Thus, an access for which the product is stored in the shopping cart and an access for which the product is purchased need to be treated as a series of accesses. Here, this operation is referred to as the session management.

As a technique that accomplishes the session management, session identification information that identifies sessions is used (hereinafter, referred to as the session IDs). A session ID is any identification information (ID) that is ordinarily generated by a random number or the like and then stored in a cookie or the hidden field of the Form tag so as to pass the session ID to the web browser. When the web browser accesses the web server next time, the web browser passes the session ID stored in the cookie to the web server or when the web browser submits data based on the Form to the web server, the web browser passes the session ID stored in the Form to the web server. Thus, the web server can treat accesses having the same session ID as a series of accesses.

Input and session ID data section 106 records data that CGI input recording section 103 and session ID recording section 105 record.

DB 107 is a database that CGI program 104 uses when it is executed. In addition, DB 107 stores data as the result of the execution of CGI program 104. Moreover, DB 107 obtains data from DB 117 through communication sections 118 and 108 while client 100 and server 110 are connected. In other words, data stored in DB 117 are copied and then stored in DB 107. DB 107 may have a file structure rather than a database structure. If the size of data stored in DB 117 is large, the history of copies that have been made may be used so as to reduce the amount of communication data.

Communication section 108 communicates with server 116.

Figure 3:
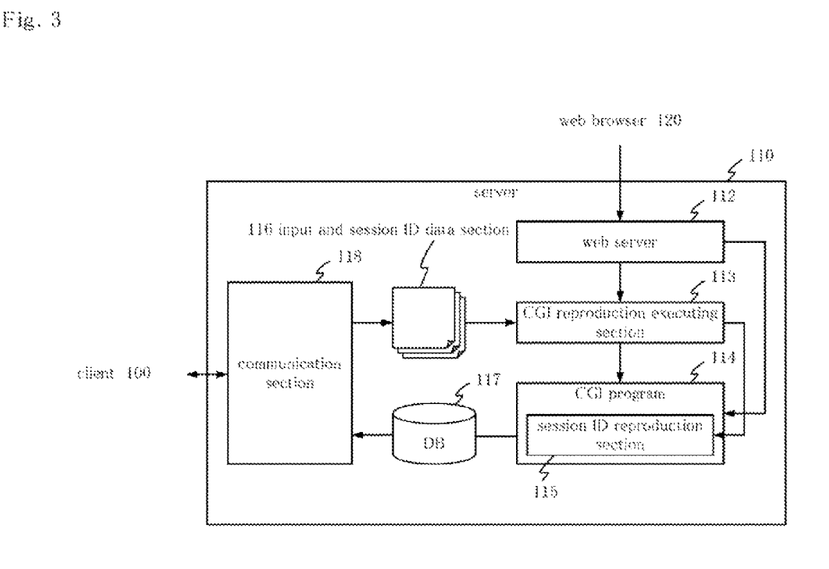
FIG. 3 is a schematic diagram showing an exemplary internal structure of a server shown in FIG. 1.

FIG. 3 shows an exemplary internal structure of server 110 shown in FIG. 1.

Server 110 shown in FIG. 1 is provided with web server 112, CGI reproduction executing section 113, CGI program 114, input and session ID data section 116, DB 117, and communication section 118 as shown in FIG. 3. FIG. 3 shows only structural elements that relate to the present invention of those of server 110 shown in FIG. 1.

Web server 112 is software that has an information transmission function over the Internet. Web server 112 executes CGI program 114 as web browsers 101 and 120 request web server 112 to do so.

CGI reproduction executing section 113 is a reproduction executing section that executes CGI program 114 based on data recorded in input and session ID data section 116.

CGI program 114 is a first web application program that web server 112 executes as web browsers 120 and 101 requests web server 112 to do so. Here, CGI program 114 will be described exemplifying the case that an interface that executes the web application program is a CGI. Besides a CGI, this interface may be an interface that can store input data necessary to re-execute the web application program.

CGI program 114 is also provided with session ID reproduction section 115.

Session ID reproduction section 115 uses session IDs recorded in input and session ID data section 116 as session IDs of session ID reproduction section 115.

Input and session ID data section 116 obtains data that are recorded in input and session ID data section 106 through communication section 118 and records the obtained data. DB 117 is a database that CGI program 114 uses when it is executed. In addition, DB 117 stores data as the result of the execution of CGI program 114. DB 117 may have a file structure rather than a database structure.

Communication section 118 communicates with client 100.

Here, the session management is the same as that described with respect to client 100.

In the embodiment shown in FIGS. 1 to 3, CGI reproduction executing section 113 of server 110 re-executes CGI program 114 based on inputs recorded in CGI input recording section 103 so as to synchronize data between client 100 and server 110. When CGI program 114 is re-executed, if a session ID that is different from that generated on client 100 that was off line is issued, an access to web server 102 that is treated as the same session while client 100 was offline is treated as a different session.

To prevent this situation, session ID recording section 105 records newly generated session IDs to input and session ID data section 106. When server 110 re-executes CGI program 114, a session ID that is recorded in session ID recording section 105 is used instead of a session ID that is newly generated. Thus, an access to web server 102 that was treated as the same session while client 100 was off line can be treated as the same session when CGI program 114 is re-executed.

Session IDs can be recorded and reproduced according to several techniques. If the CGI program can be modified, session IDs can be recorded and reproduced in the CGI program level. If the CGI program performs the session management, an API (Application Program Interface) that the CGI program provides can be used so as to generate session IDs and obtain the generated session IDs. For example, the CGI program is notified of "off line execution" or "reproduction execution" (including a session ID to be used in "reproduction execution"). If an off line execution is performed, a session ID is generated; if a reproduction execution is performed, a session ID obtained from an input is used.

As an alternative technique, the environment in which the CGI program is executed, namely a PHP language processing system or a Perl library, may be changed. The operation according to this technique is the same as to that according to the above-described technique.

When client 100 that is off line accesses web server 102 that operates therein a multiple number of times, inputs to CGI program 104 and generated session IDs are recorded in input and session ID data section 106.

In the following, a data synchronization method according to this embodiment will be described. First, a process of client 100 shown in FIG. 1 in the data synchronization method according to this embodiment will be described.

Figure 4:
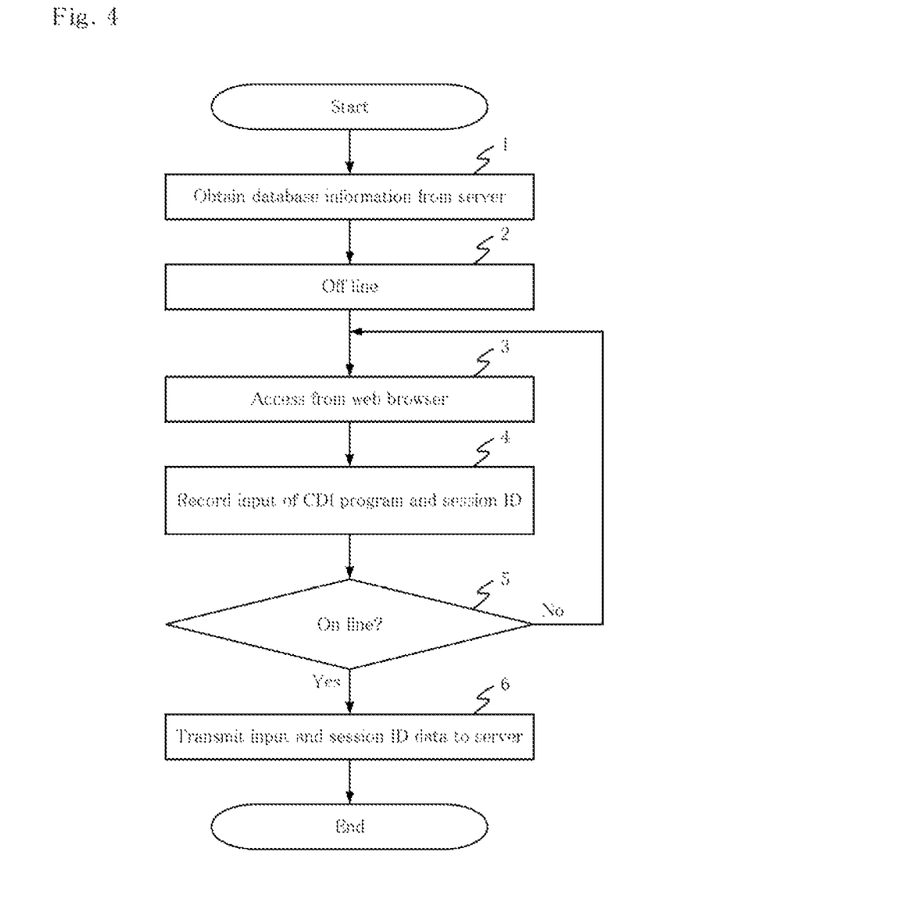
FIG. 4 is a flow chart describing a process of the client show in FIG. 1 in a data synchronization method according to this embodiment.

FIG. 4 is a flow chart describing the process of client 100 shown in FIG. 1 in the data synchronization method according to this embodiment.

First, data base information stored in DB 117 is obtained through communication section 108 at step 1 and then the obtained database information is stored in DB 107.

Thereafter, client 100 is disconnected from server 110 at step 2. If client 100 and server 110 are connected through a network, client 100 is disconnected (separated) from the network. This state is "off line state." By contrast, the state in which client 100 and server 110 are connected (they may be connected through the network) is "on line state."

Thereafter, when web server 102 is accessed and the web application is used on the web browser 101 in the off line state at step 3, web server 102 executes CGI program 104. The input (data sequence) and the generated session ID are recorded in input and session ID data section 106 through CGI input recording section 103 and session ID recording section 105 as a procedure of the execution of the program at step 4. This input is recorded in the execution order or stored along with information that represents the chronological order so as to determine the chronological order of the execution.

At step 3 and step 4 of the process are repeated until client 100 becomes the on line state.

When client 100 enters the on line state at step 5, data (input and session ID data that are recorded as the procedure of the execution of the program) recorded in input and session ID data section 106 are transmitted to server 110 through communication section 108 at step 6. At this point, data are transmitted along with information that represents the above-described chronological order.

Next, a process of server 110 shown in FIG. 1 in the data synchronization method according to this embodiment will be described.

Figure 5:
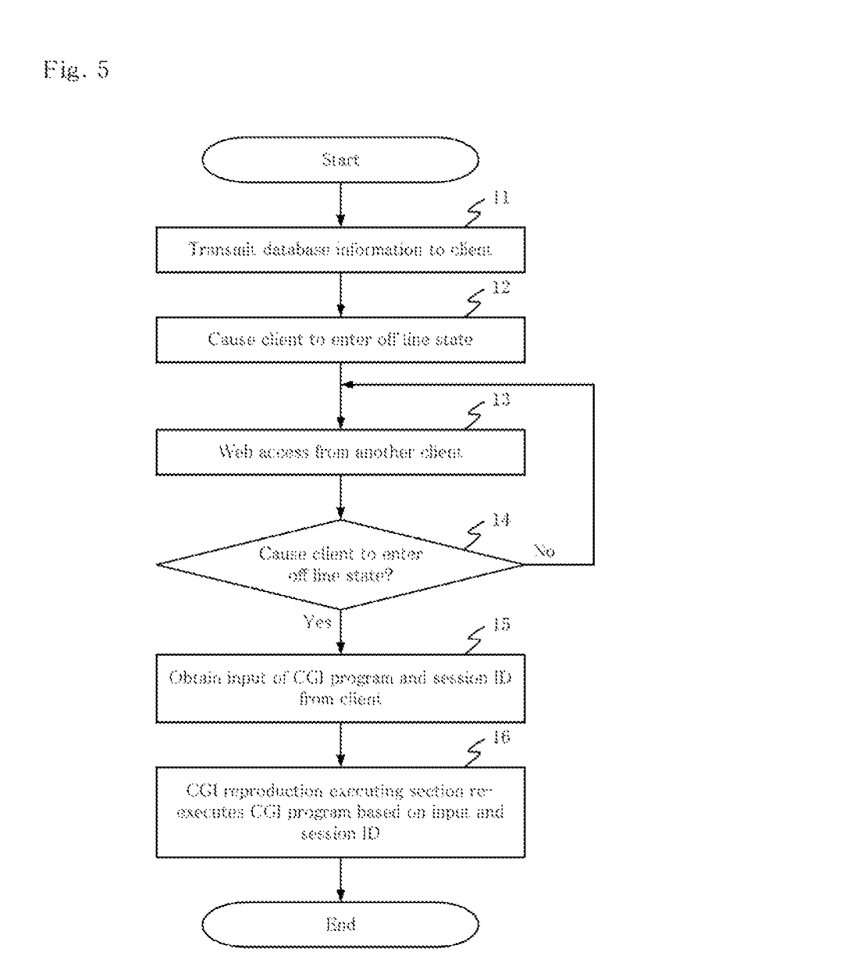
FIG. 5 is a flow chart describing a process of the server shown in FIG. 1 in the data synchronization method according to this embodiment.

FIG. 5 is a flow chart describing the process of server 110 shown in FIG. 1 in the data synchronization method according to this embodiment.

First, database information stored in DB 117 is transmitted from communication section 118 to client 100 as client 100 requests server 110 to do so at step 11. At this point, the connection state of server 110 and client 100 has entered the on line state.

Thereafter, when client 100 enters the off line state at step 12, if another client (for example, web browser 120) issues a request to server 110, it ordinarily accepts the request at step 13 and performs the process. The process performed while client 100 is off line updates data stored in DB 117.

When client 100 enters the on line state at step 14, data recorded in input and session ID data section 106 are obtained through communication section 118 at step 15 and recorded in input and session ID data section 116. In other words, data recorded in input and session ID data section 106 are copied to input and session ID data section 116.

Then, CGI reproduction executing section 113 executes CGI program 114 based on data (input and session ID data stored as the procedure of the execution of the program) recorded in entry session ID data 116. At this point, CGI program 114 is executed in the same order as CGI program 104 is executed by client 100. CGI program 114 uses a session ID contained in the input data in the same manner as the session ID supplied as described above.

The execution of CGI program 114 by CGI reproduction executing section 113 is equal to the re-execution of the program that client 100 has executed in the off line state by server 110. Thus, the use of the web application (web access) by client 100 that is off line can be reflected to server 110. In addition; an update of DB 107 can be reflected to DB 117. Thus, the above-described problem in which data are not correctly synchronized between client 100 and server 110 can be solved.

In the following, with reference to a drawing, another embodiment of the present invention will be described.

Figure 6:
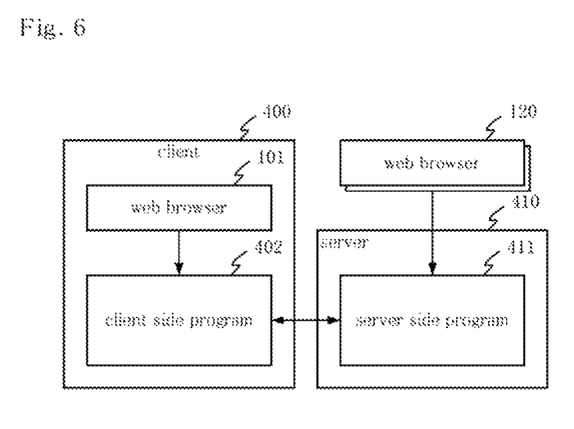
FIG. 6 is a schematic diagram showing a data synchronization system according to another embodiment of the present invention.

FIG. 6 is a schematic diagram showing a data synchronization system according to another embodiment of the present invention.

The data synchronization system according to this embodiment is composed of client 400, server 410, and web browser 120 as shown in FIG. 6.

Client 400 is provided with web browser 101 and client side program 402.

Web browser 101 is the same as that shown in FIG. 2.

Client side program 402 performs the same processes as do web server 102, CGI input recording section 103, CGI program 104, input and session ID data section 106, DB 107, and communication section 108 shown in FIG. 2. In other words, the processes of individual elements shown in FIG. 2 are not performed by an application specific logical circuit. Instead, client side program 402 that codes the contents of the processes is recorded in a recording medium that is readable by client 400 and then client side program 402 recorded in the recording medium is read and executed by client 400. Examples of the recording medium readable by client 400 include removable recording mediums, such as a floppy disk (registered trademark), a magneto-optical disc, a DVD, and a CD, and an HDD built in client 400. Client side program 402 recorded in the recording medium is read under the control of a CPU (not shown) built in client 400 and then the processes that are the same as those described above are performed under the control of the CPU. Here, the CPU operates as a computer that executes client side program 402 that is read from the recording medium.

In addition, server 410 is provided with server side program 411.

Server side program 411 performs the same processes as do web server 112, CGI reproduction executing section 113, CGI program 114, input and session ID data section 116, DB 117, and communication section 118 shown in FIG. 3. In other words, the processes of individual elements shown in FIG. 3 are not performed by an application specific logic circuit. Instead, server side program 411 that codes the contents of the processes is recorded to a recording medium readable by server 410 and then server side program 411 is read and executed by server 410. Examples of the recording medium readable by server 410 include removable recording mediums, such as a floppy disk (registered trademark), a magneto-optical disc, a DVD, and a CD, and an HDD built in server 410. Server side program 411 recorded in the recording medium is read under the control of a CPU (not shown) built in server 410 and then the processes that are the same as those described above are performed under the control of the CPU. Here, the CPU operates as a computer that executes server side program 411 that is read from the recording medium.

The above-described present invention has the following effects.

As a first effect, when client 100 and server 110 are synchronized, even if data are updated on both the sides, data can be correctly synchronized.

This means that since server 110 re-executes a process that client 100 has performed, an update that client 100 has performed in the off line state is reflected to server 110 based on the result of the update performed by client 100 while client 100 was in the off line state.

As a second effect, data can be synchronized between client 100 and server 110 nearly without necessity of modifying the program.

This means that since input data upon execution of the program are stored on the system side and the program is re-executed based on the data, it is not necessary to modify the program so as to synchronize data.

The present invention can be applied to fields in which web applications have been ordinarily used, namely a blog, an SNS (Social Networking Service), a bulletin board, a shopping site, and an industrial transaction application where an application is executed off line and data are synchronized.

Now, with reference to the embodiments, the present invention has been described. However, it should be understood by those skilled in the art that the structure and details of the present invention may be changed in various manners without departing from the scope of the present invention.

The present application claims priority based on Japanese Patent Application JP 2009-066297 filed on Mar. 18, 2009, the entire contents of which are incorporated herein by reference in its entirety.

The invention claimed is:

1. A data synchronization system comprising: a server that executes a first web application program that accomplishes a web application that provides a service over the Internet so as to provide said service; and a communication device that receives the service that the server provides,
wherein said communication device has a second web application program that accomplishes said web application, executes said second web application program after said communication device is not connected to said server, after executing said web application program records a procedure in which said communication device has executed said second web application program, and transmits said recorded procedure to said server after recording said procedure and just after said communication device is connected to said server,
wherein said server executes said first web application program based on the procedure transmitted from said communication device,
wherein said communication device has a web browser and a web server, said web server executes said second web application program as said web browser requests said web server to do so while said communication device is not connected to said server, when said web server executes said second web application program, said web server records a data sequence and a chronological order of the data sequence that said web server supplies to said second web application program as said procedure, and just after said communication device is connected to said server, said communication device transmits said recorded data sequence and the chronological order of the data sequence to said server, and
wherein said server executes said first web application program based on the data sequence and the chronological order of the data sequence transmitted from said communication device.

2. The data synchronization system as set forth in claim 1, wherein said communication device executes a CGI (Common Gateway Interface) program as said second web application program, and
wherein said server executes a CGI program as said first web application program.

3. The data synchronization system as set forth in claim 1, wherein said communication device also records session identification information that is generated in said second web application program when said second web application program is executed and that identifies a session and transmits said recorded session identification information to said server just after said communication device is connected to said server, and
wherein said server executes said first web application program based on the session identification information transmitted from said communication device.

4. The data synchronization system as set forth in claim 2, wherein said communication device also records session identification information that is generated in said CGI program when said CGI program is executed and that identifies a session and transmits said recorded session identification information to said server just after said communication device is connected to said server, and
wherein said server executes said CGI program based on the session identification information transmitted from said communication device.

5. A communication device that receives a service from a server that accomplishes a web application that provides the service over the Internet, comprising:
a web application program that accomplishes said web application;
an input recording section that records a procedure of said web application program executed after said communication device is not connected to said server;
a communication section that transmits the procedure recorded in said input recording section to said server just after said communication device is connected to said server;
a web browser; and
a web server,
wherein said web server executes said web application program as said web browser requests said web server to do so while said communication device is not connected to said server,
wherein said input recording section records a data sequence and a chronological order of the data sequence that said web server supplies to said web application program as said procedure when said web server executes said web application program, and
wherein said communication section transmits the data sequence and the chronological order of the data sequence recorded in said input recording section to said server just after said communication device is connected to said server.

6. The communication device as set forth in claim 5, wherein said web server executes a CGI (Common Gateway Interface) program as said web application program.

7. The communication device as set forth in claim 5, wherein said input recording section also records session identification information that is generated in the web application program when said web application program is executed and that identifies a session, and
wherein said communication section transmits the session identification information recorded in said input recording section to said server just after said communication device is connected to said server.

8. The communication device as set forth in claim 6, comprising:
a session ID recording section that records session identification information that is generated in said CGI program when said CGI program is executed and that identifies a session,
wherein said communication section transmits the session identification information recorded in said session ID recording section to said server just after said communication section is connected to said server.

9. A data synchronization method that synchronizes data between a server that executes a first web application program that accomplishes a web application that provides a service over the Internet so as to provide said service and a communication device that receives the service that the server provides, comprising:
a process that causes said communication device to execute a second web application program that accomplishes said web application after said communication device is not connected to said server;
a process that causes, after said second web application program has been executed, said communication device to record a procedure in which said communication device has executed said second web application program while said communication device is not connected to said server;
a process that causes, after said procedure has been recorded, said communication device to transmit said recorded procedure to said server just after said communication device is connected to said server;
a process that causes, after said recorded procedure has been transmitted, said server to execute said first web application program based on the procedure transmitted from said communication device;
a process that causes a web server that said communication device has to execute said second web application program as said web browser that the communication device has requests said web server to do so while said communication device is not connected to said server;
a process that causes said communication device to record a data sequence and a chronological order of the data sequence that said web server supplies to said second web application program as said procedure when said web server executes said second web application program;
a process that causes said communication device to transmit said recorded data sequence and the chronological order of the data sequence to said server just after said communication device is connected to said server, and
a process that causes said server to execute said first web application program based on the data sequence and the chronological order of the data sequence transmitted from said communication device.

10. The data synchronization method as set forth in claim 9, comprising:
a process that causes said communication device to execute a CGI (Common Gateway Interface) program as said second web application program; and
a process that causes said server to execute a CGI program as said first web application program.

11. The data synchronization method as set forth in claim 9, comprising:
a process that causes said communication device to also record session identification information that is generated in said second web application program when said second web application program is executed and that identifies a session;
a process that causes said communication device to transmit said recorded session identification information to said server just after said communication device is connected to said server; and
a process that causes said server to execute said first web application program based on the session identification information transmitted from said communication device.

12. The data synchronization method as set forth in claim 10, comprising:
a process that causes said communication device to also record session identification information that is generated in said CGI program when said CGI program is executed and that identifies a session;
a process that causes said communication device to transmit said recorded session identification information to said server just after said communication device is connected to said server; and
a process that causes said server to execute said CGI program based on the session identification information transmitted from said communication device.

* * * * *